(12) United States Patent
Ghazal et al.

(10) Patent No.: US 10,642,834 B1
(45) Date of Patent: May 5, 2020

(54) PUSHING JOINS ACROSS A UNION

(71) Applicant: Teradata Corporation, Dayton, OH (US)

(72) Inventors: Ahmad Said Ghazal, Redondo Beach, CA (US); William Joseph McKenna, Oceanside, CA (US)

(73) Assignee: Teradata US, Inc., San Diego, CA (US)

( * ) Notice: Subject to any disclaimer, the term of this patent is extended or adjusted under 35 U.S.C. 154(b) by 526 days.

(21) Appl. No.: 15/474,657

(22) Filed: Mar. 30, 2017

Related U.S. Application Data

(62) Division of application No. 12/140,852, filed on Jun. 17, 2008, now abandoned.

(51) Int. Cl.
*G06F 16/00* (2019.01)
*G06F 16/2453* (2019.01)
*G06F 16/242* (2019.01)

(52) U.S. Cl.
CPC ...... *G06F 16/24544* (2019.01); *G06F 16/244* (2019.01)

(58) Field of Classification Search
CPC .................................................. G06F 16/24544
USPC .................................................. 707/713, 714
See application file for complete search history.

(56) References Cited

U.S. PATENT DOCUMENTS

| 7,747,606 B2 * | 6/2010 | Dageville | G06F 16/217 707/713 |
| 2007/0067274 A1 * | 3/2007 | Han | G06F 16/2456 |
| 2007/0219951 A1 * | 9/2007 | Ahmed | G06F 16/24544 |

* cited by examiner

*Primary Examiner* — Chelcie L Daye
(74) *Attorney, Agent, or Firm* — Howard Speight

(57) ABSTRACT

Selecting a join plan for a query containing a join and a union block includes determining whether to propose a join plan with the join pushed across the union block. A selection is made between a join plan in which the join is not pushed across the union block and any proposed join plan in which the join is pushed across the union block.

8 Claims, 3 Drawing Sheets

PUSHING JOINS ACROSS A UNION

CROSS-REFERENCE TO RELATED APPLICATIONS

This application is a divisional of U.S. patent application Ser. No. 12/140,852, filed 17 Jun. 2008, which is incorporated by reference in its entirety.

BACKGROUND

Database systems execute queries that are sometimes expressed in a query language such as Structured Query Language ("SQL"). Database systems work to execute queries in an efficient manner.

Some queries include joins and union blocks. Efficiently executing such queries is a challenge.

SUMMARY

In general, in one aspect, the invention features a method for selecting a join plan for a query containing a join and a union block. The method includes determining that the join is an inner join, in response determining that the union block is a UNION ALL, and in response proposing a join plan with the join pushed across the union block. The method further includes selecting between the join plan with the join pushed across the union block and a join plan without the join being pushed across the union block.

In general, in another aspect, the invention features a method for selecting a join plan for a query containing a join and a union block. The method includes determining whether to propose a join plan with the join pushed across the union block and selecting between a join plan in which the join is not pushed across the union block and any proposed join plan in which the join is pushed across the union block.

Implementations of the invention may include one or more of the following. Determining whether to propose a join plan with the join pushed across the union block may include considering whether the join is an inner join or an outer join. Determining whether to propose a join plan with the join pushed across the union block may include considering whether the union block is a UNION ALL or a UNION (distinct). The join may be an inner join. The union block may include a UNION (distinct) having branches. Determining whether to propose a join plan with the join pushed across the union block may include considering whether the join increases the cardinality of the branches of the union block. The join may be an outer join. The union block may include branches. Determining whether to propose a join plan with the join pushed across the union block may include considering whether the join increases the cardinality of the branches of the union block.

In general, in another aspect, the invention features a method for selecting a join plan for a query containing a plurality of joins and a union block. The method may include selecting from among the plurality of joins a subset to consider for pushing across the union block. The method may include identifying from among the selected joins N joins for which pushing the join across the union block is semantically correct. The method may include proposing a join plan for all of the plurality of joins without any of the joins being pushed across the union block. The method may include proposing 2N separate join plans for the plurality of joins, each of the 2N separate join plans including a unique combination of pushed joins and unpushed joins. The method may include selecting a join plan from among the proposed join plans.

Implementations of the invention may include one or more of the following. Selecting from among the plurality of joins a subset to consider for pushing across the union block may include determining that the number of joins in the plurality of joins is too great to propose a join plan for each of the possible alternatives of pushing one of the plurality of joins across the union block or not and in response, applying a set of heuristics to select fewer than all of the plurality of joins to consider for pushing across the union block. The subset may be all of the plurality of joins. The subset may be a proper subset of the plurality of joins. Identifying the selected joins that should be pushed across the union block may include determining that one of the selected joins comprises an inner join, and in response, determining that the union block comprises a UNION ALL, and in response, identifying the one of the selected joins as an identified join. The union may include a plurality of branches. Each of the plurality of branches may have a cardinality. Identifying the selected joins that should be pushed across the union block may include determining that one of the selected joins comprises an inner join, and in response, determining that the union block comprises a UNION (distinct), and in response, determining that pushing the one of the selected joins will not increase the cardinality of any of the plurality of branches of the union block, and in response, identifying the one of the selected joins as an identified join. The union may include a plurality of branches. Each of the plurality of branches may have a cardinality. Identifying the selected joins that should be pushed across the union block may include determining that one of the selected joins comprises an inner join, and in response, determining that the union block comprises a UNION (distinct), and in response, determining that pushing the one of the selected joins will increase the cardinality of any of the plurality of branches of the union block, and in response, rejecting the one of the selected joins as an identified join. Identifying the selected joins that should be pushed across the union block may include determining that one of the selected joins comprises an outer join having an outer table and an inner table, and in response, determining that the union block is the outer table, and in response, identifying the one of the selected joins as an identified join. Identifying the selected joins that should be pushed across the union block may include determining that one of the selected joins comprises an outer join having an outer table and an inner table, and in response, determining that the union block is the inner table, and in response, rejecting the one of the selected joins as an identified join.

DETAILED DESCRIPTION

Figure 1:
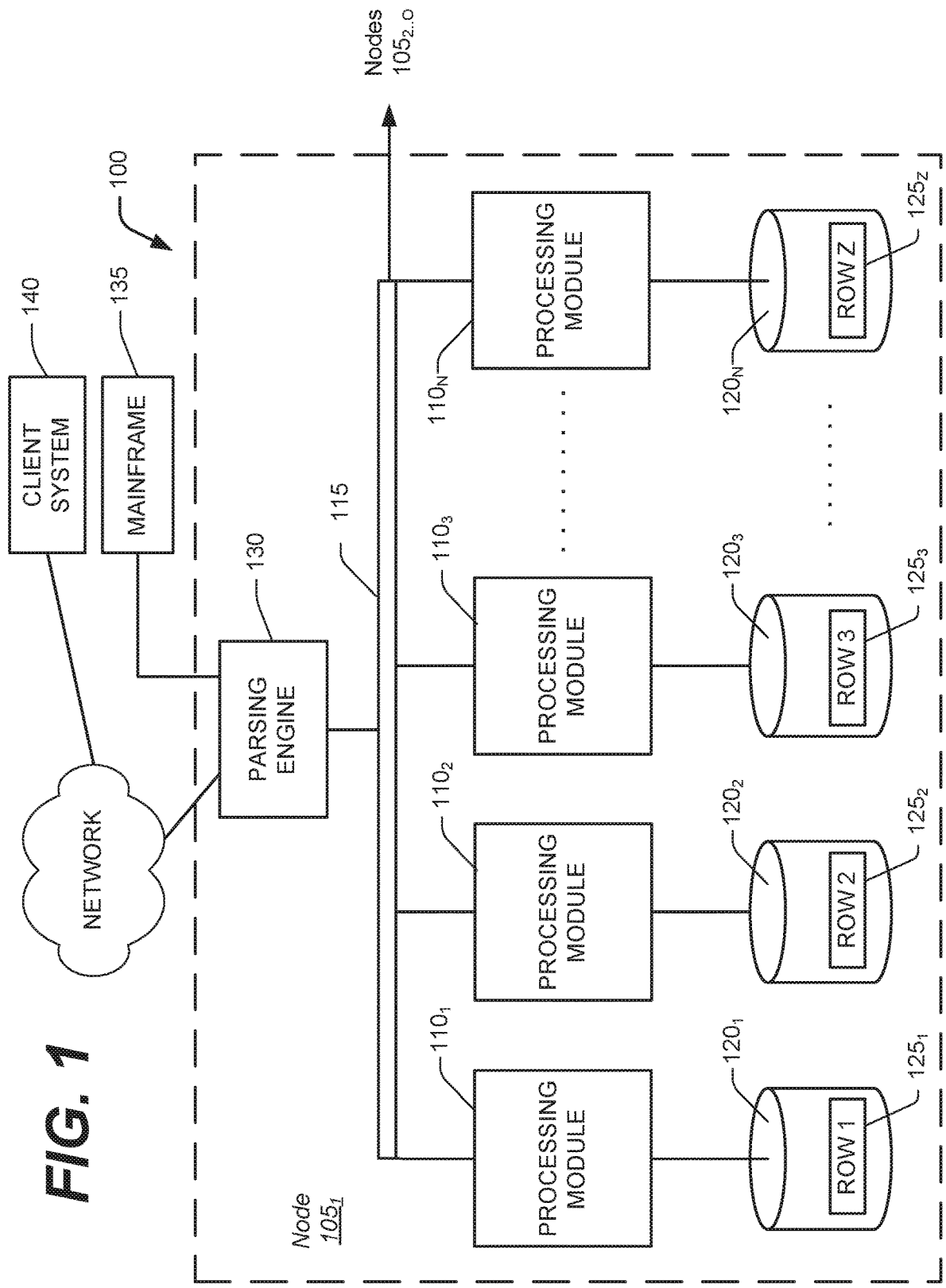
FIG. 1 is a block diagram of a node of a database system.

The technique for pushing joins across unions disclosed herein has particular application, but is not limited, to large databases that might contain many millions or billions of records managed by a database system ("DBS") 100, such as a Teradata Active Data Warehousing System available from the assignee hereof. FIG. 1 shows a sample architecture for one node $105_1$ of the DBS 100. The DBS node $105_1$ includes one or more processing modules $110_{1 \ldots N}$, also referred to as AMPS, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

In addition to the physical division of storage among the storage facilities illustrated in FIG. 1, each storage facility is also logically organized. One implementation divides the storage facilities into logical blocks of storage space. Other implementations can divide the available storage space into different units of storage. The logical units of storage can ignore or match the physical divisions of the storage facilities.

Figure 2:
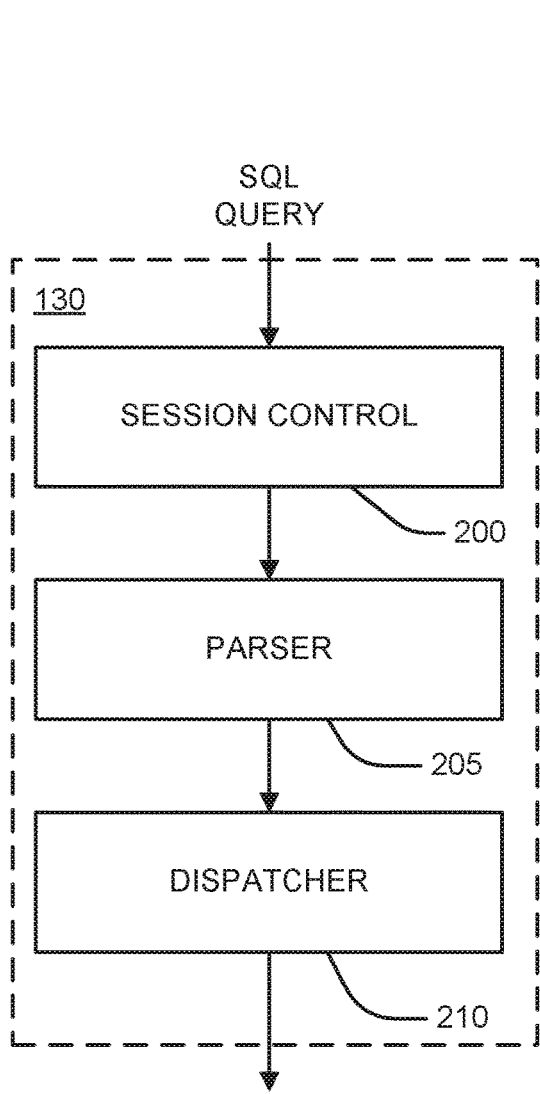
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
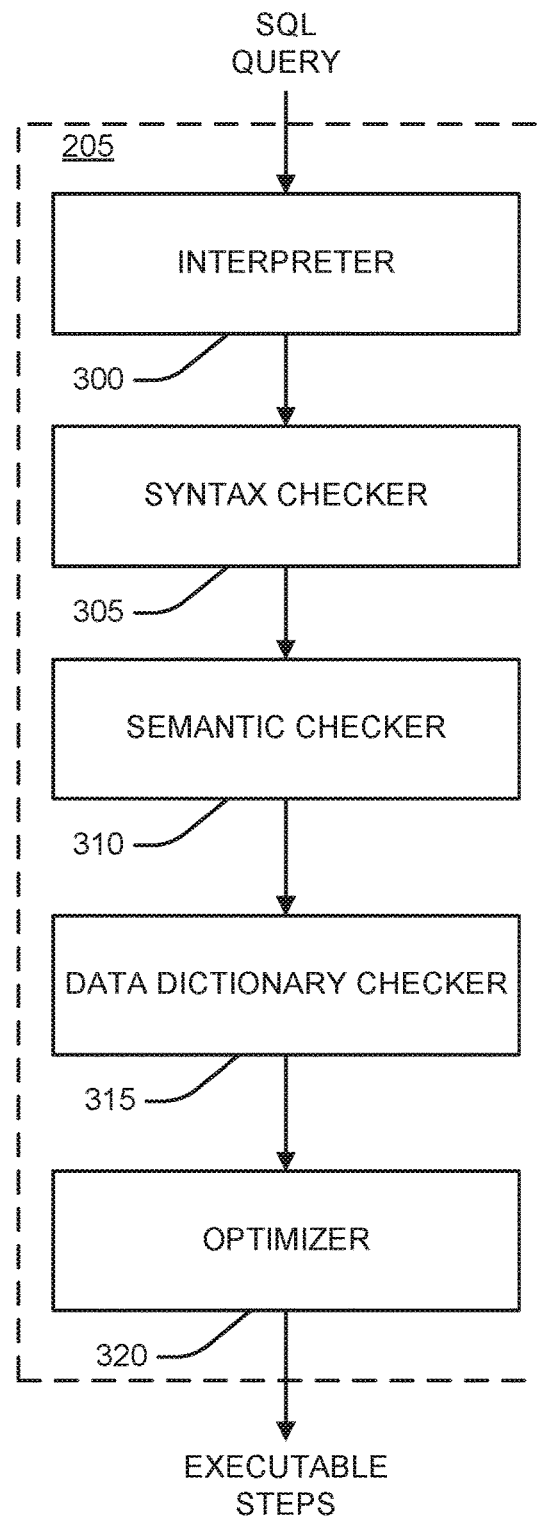
FIG. 3 is a flow chart of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request.

To illustrate the technique of pushing joins across a union, assume three tables t1, t2 and t3 as defined below where each has 1,000,000 rows. Also, assume that the values of t3.b3 are uniformly distributed with 5 rows per unique value.
  CREATE TABLE t1 (a1 integer unique not null);
  CREATE TABLE t2 (a2 integer unique not null);
  CREATE TABLE t3 (a3 integer unique not null, b3 integer);
  CREATE VIEW v1 (va1) as
  SELECT a1 FROM t1
  UNION ALL
  SELECT a2 FROM t2;
  A query that joins v1 with t3 such as:
  SELECT va1, a3 FROM v1, t3
  WHERE b3=3 and a3=va1;
can be executed in general in two ways:
  1. Union followed by a join. This plan spools 2,000,000 rows which are joined to t3 which produces a 5 row result after applying the a3=3 condition.
  2. Join followed by Union. From a rewrite prospective this plan looks like:
  SELECT a1, a3 FROM t1, t3
  WHERE a1=a3 and b3=3
  UNION ALL
  SELECT a2, a3 FROM t2, t3
  WHERE a2=a3 and b3=3;
In the latter approach, each retrieve is a direct join (primary index to primary index) between 5 rows of t3 with t1/t2. The Union produces a maximum of 10 rows.

In the example above, approach 2 is a more cost efficient way of executing the query. There are cases where approach 1 is more cost efficient than approach 2. The optimizer should pick the option with the least "estimated" cost.

In one embodiment, a query rewrite (QRW) subsystem within the optimizer provides two alternatives for each join (one alternative with the join pushed across the UNION and one alternative without the join pushed across the UNION) to the join planner. In one embodiment, the join planner costs each alternative and picks the one with the least cost.

In one embodiment, the QRW subsystem may process queries with more than one join. An example of such a join (which builds on the example above) is:
  CREATE TABLE t4 (a4 integer unique not null, b4 integer);
  SELECT va1, a3 FROM v1, t3, t4
  WHERE b3=3 and a3=va1 and b4=5 and a4=va1;
  This query includes two joins (v1 with t3 and v1 with t4) and, in one embodiment, the QRW subsystem could rewrite the query in four (2**2) possible ways:
  (a) do not push either join (i.e., no rewrite);
  (b) push the v1/t3 join but not the v1/t4 join;
  (c) push the v1/t4 join but not the v1/t3 join; and
  (d) push both the v1/t3 join and the v1/t4 join.

In one embodiment, there are two factors that are considered in determining whether to push a join across a union block. First, in one embodiment, the system considers whether it is semantically correct to push a particular join across a particular union block. "Semantically correct" in this context means that the query with the join pushed across the union block produces the same answer set as the query with the join not pushed across the union block.

In one embodiment, the second factor is that the number of different ways of pushing joins could be so large that it is prohibitively expensive for the join planner to cost them. For example, if there are N different candidate joins that can be pushed then the QRW subsystem could end up enumerating 2**N different SQL statements to be considered by the join planner.

1. When it is Semantically Correct to Push a Join Across a UNION Block?

In one embodiment, if the union in the query is a UNION ALL, it is always correct to push joins across. Without a formal proof, this can be verified by comparing the result of applying a UNION followed by a join versus the opposite way (join followed by a UNION). In other words, it is true that R1 Join (R2 UNION ALL R3)

is the same as (R1 Join R2 UNION ALL R1 Join R3).

This is because Rx Join Ry can be done by combining the join results of Rx with subsets of Ry.

In one embodiment, if the UNION in the query is a UNION (distinct), it may not be correct to push a join across the UNION since applying the distinct before the join may lead to different results than applying the distinct after the join. In one embodiment, the exception is that pushing a join across the UNION (distinct) is correct if the join itself does not increase the cardinality of branches of the UNION. In one embodiment, one example of such a join is a unique join (i.e., the join fields of R1 are unique). For example, rewriting R1 Join (R2 UNION R3) as (R1 Join R2 UNION R1 Join R3) is semantically correct if both joins between R1 and R2/R3 are based on equality with unique fields of R1.

The discussion above applies to inner joins. In one embodiment, for an outer join where the UNION side is the "inner table" (e.g., R1 left outer join (R2 UNION R3)), it may not be correct to push the join across a "UNION/UNION ALL". The reason is that there could be more un-matching rows if the join is done before the UNION compared to joins after the UNION.

In one embodiment, if the UNION side is the outer table like (R2 UNION R3) left join R1, and then it is semantically correct to push the join across the UNION. The reason is that both ways produce the same un-matching rows. In one embodiment, full outer joins cannot be pushed for the same reason "left outer" joins cannot be pushed.

2. QRW Heuristics to Enumerate SQL Using Pushing Joins.

As mentioned before, there could be an exponential number of ways the QRW subsystem can rewrite a query to push one or more joins across a UNION block. Therefore, in one embodiment, when the QRW subsystem determines that too many alternatives exist, the QRW subsystem applies heuristics to limit the number of alternatives.

For example, a join that reduces the number of qualified rows before the UNION is executed is an alternative that, in one embodiment, is a good candidate to be pushed. Such a join can be identified, in one embodiment, by considering joins with unique fields and in which the pushed relation has a constraint on it. In the single-join example described above t3 is joined using a3 which is unique. Also, t3 has a constraint on b3.

In one embodiment, other heuristics can be used to limit the number of enumerated SQL that must be evaluated by the join planner, such as having a limit on the number to be evaluated or selecting a subset of the 2**N (N being the number of eligible joins to be pushed) to evaluate.

Figure 4:
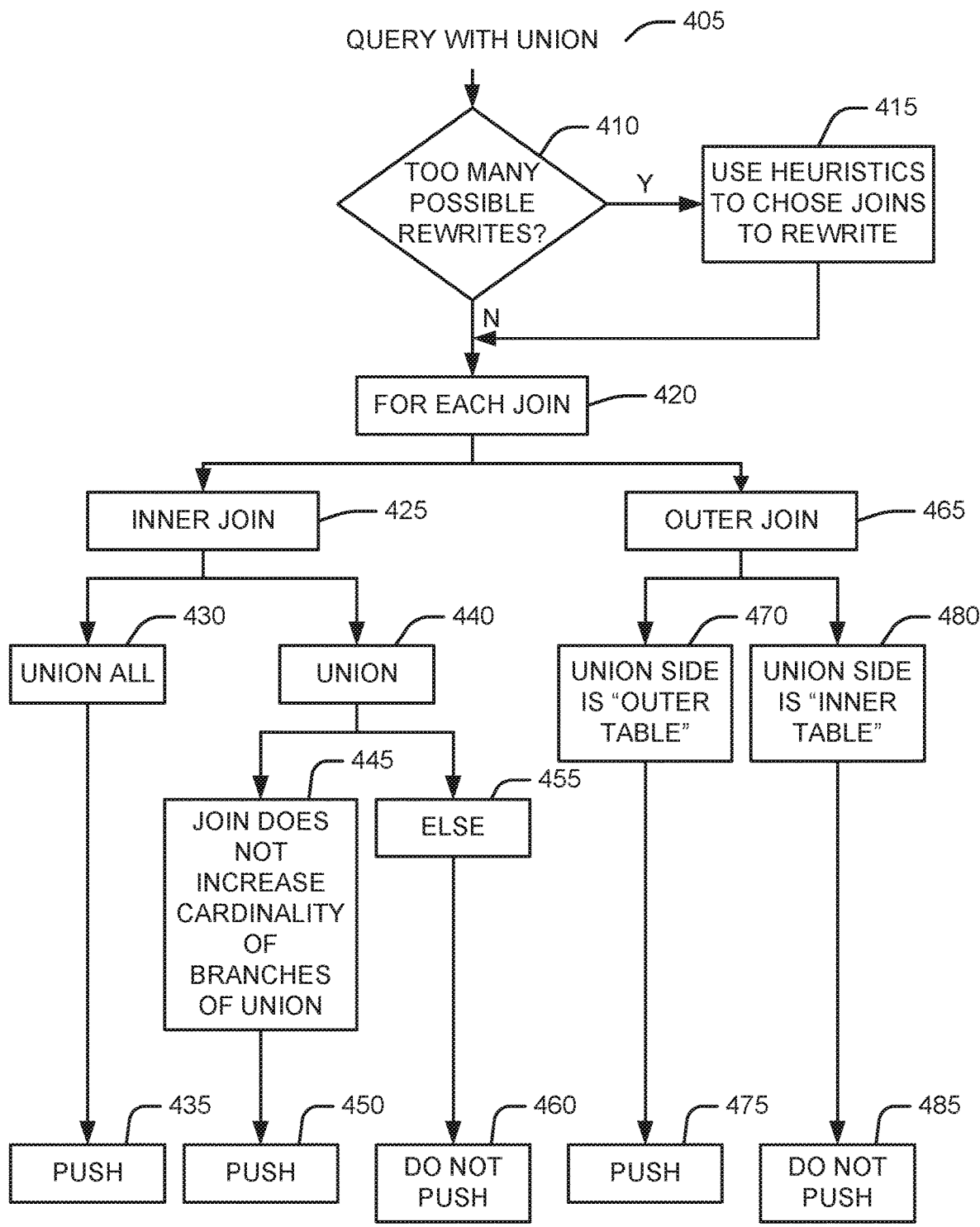
FIG. 4 is a flow chart illustrating the selection of an alternative join plan for a query involving a join and a union block.

In practice, in one embodiment shown in FIG. 4, upon receipt of a query with a UNION block (block 405), the system determines if the number of joins results in too many possible rewrites (block 410). If there are, the system uses heuristics, such as those described above, to choose one or more joins to rewrite (block 415). Then, for each join (block 420), the system determines if the join is an inner join or an outer join.

In one embodiment, if the join is an inner join (block 425) and the UNION block is a UNION ALL (block 430), the QRW subsystem will include pushing the join across the UNION block as an alternative (block 435). In one embodiment, if the join is an inner join (block 425), the UNION block is a UNION (distinct) (block 440), and the join does not increase the cardinality of the branches of the union (block 445), the QRW subsystem will include pushing the join across the UNION block as an alternative (block 435). In one embodiment, if the join is an inner join (block 425), the UNION block is a UNION (distinct) (block 440), and the join increases the cardinality of the branches of the union (block 455), the QRW subsystem will not include pushing the join across the UNION block as an alternative (block 460).

In one embodiment, if the join is an outer join (block 465) and the UNION side of the join is the "outer table" (block 470), the QRW subsystem will include pushing the join across the UNION block as an alternative (block 475). In one embodiment, if the join is an outer join (block 465) and the UNION side of the join is the "inner table" (block 480), the QRW subsystem will not include pushing the join across the UNION block as an alternative (block 480).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for selecting a join plan for a query containing a plurality of joins and a union block, the computer-implemented method comprising:
  selecting from among the plurality of joins a subset to consider for pushing across the union block;
  identifying from among the selected joins N joins for which pushing the join across the union block is semantically correct;
  proposing a join plan for all of the plurality of joins without any of the joins being pushed across the union block;
  proposing $2^N$ separate join plans for the plurality of joins, each of the $2^N$ separate join plans comprising a unique combination of pushed joins and unpushed joins; and
  selecting a join plan from among the proposed join plans;
  wherein selecting from among the plurality of joins a subset to consider for pushing across the union block comprises:
    determining that the number of joins in the plurality of joins is too great to propose a join plan for each of the possible alternatives of pushing one of the plurality of joins across the union block or not; and in response, applying a set of heuristics to select fewer than all of the plurality of joins to consider for pushing across the union block.

2. The computer-implemented method of claim 1 wherein the subset is all of the plurality of joins.

3. The computer-implemented method of claim 1 wherein the subset is a proper subset of the plurality of joins.

4. The computer-implemented method of claim 1 wherein identifying the selected joins that should be pushed across the union block comprises:
   determining that one of the selected joins comprises an inner join;
   in response, determining that the union block comprises a UNION ALL; and
   in response, identifying the one of the selected joins as an identified join.

5. The computer-implemented method of claim 1 wherein the union comprises a plurality of branches, each of the plurality of branches has a cardinality, and wherein identifying the selected joins that should be pushed across the union block comprises:
   determining that one of the selected joins comprises an inner join;
   in response, determining that the union block comprises a UNION (distinct);
   in response, determining that pushing the one of the selected joins will not increase the cardinality of any of the plurality of branches of the union block; and
   in response, identifying the one of the selected joins as an identified join.

6. The computer-implemented method of claim 1 wherein the union comprises a plurality of branches, each of the plurality of branches has a cardinality, and wherein identifying the selected joins that should be pushed across the union block comprises:
   determining that one of the selected joins comprises an inner join;
   in response, determining that the union block comprises a UNION (distinct);
   in response, determining that pushing the one of the selected joins will increase the cardinality of any of the plurality of branches of the union block; and
   in response, rejecting the one of the selected joins as an identified join.

7. The computer-implemented method of claim 1 wherein identifying the selected joins that should be pushed across the union block comprises:
   determining that one of the selected joins comprises an outer join having an outer table and an inner table;
   in response, determining that the union block is the outer table;
   in response, identifying the one of the selected joins as an identified join.

8. The computer-implemented method of claim 1 wherein identifying the selected joins that should be pushed across the union block comprises:
   determining that one of the selected joins comprises an outer join having an outer table and an inner table;
   in response, determining that the union block is the inner table; and
   in response, rejecting the one of the selected joins as an identified join.

* * * * *